July 29, 1969 L. M. GODFREY, JR., ET AL 3,458,859

BINARY GAIN RECOVERY

Filed Jan. 15, 1968

United States Patent Office 3,458,859
Patented July 29, 1969

3,458,859

BINARY GAIN RECOVERY

Lawrence M. Godfrey, Jr., University Park, and James R. McBeth, Garland, Tex., assignors to Texas Instruments Incorporated, Dallas, Tex., a corporation of Delaware Filed Jan. 15, 1968, Ser. No. 697,870
Int. Cl. G01v 1/28
U.S. Cl. 340—15.5 18 Claims

ABSTRACT OF THE DISCLOSURE

A method for recovering binary gain from a binary gain coded record of a plurality of traces and the individual gain factor exponent for each trace, and constructing an evenly modulated display with a common gain for all traces. Each coded trace and its associated gain factor exponent for one sample time is read from the record and a smooth gain function constructed by averaging all the recorded gain factor exponents. The binary gain is removed from each trace by multiplication with the reciprocal of its related gain factor and replaced with the smooth gain function which is constant for each trace for each sample time. A display produced from the trace and smooth gain function combination is evenly modulated and continuous for the complete recording time.

This invention relates to data processing and more particularly to data processing and the production of a continuous evenly modulated signal from binary gain coded data.

In the field of seismic exploration there has been a rapid growth of digital recording of the seismic wave signals. The amplifiers employed in the digital seismic recording may be operated with programmed gain control, ganged automatic volume control, or binary gain controlled. If binary gain control (BGC) is used, the gain of each seismic trace may be controlled on an individual analog basis or on groups of channels. Recently, there has appeared a marked preference of recording seismic data using binary gain control (BGC) on a multitrack tape. One of the advantages of BGC is that each trace gain changes up or down only by a fixed factor, usually by a factor of 2(+6 decibels).

Another advantage of BGC is that the dynamic range of the recording tape is always optimumly utilized since the coded number written on the tape will be near the full modulation capability of the recording system, regardless of the value of a particular seismometer signal. Binary gain control also has the advantage of reducing the probability of overmodulation of a number written on the recording tape. Finally, binary gain control recording results in a wide dynamic range capability and efficient processing of the recorded data by a digital computer.

Presently, the systems employed for playback of the BGC record tape produce a display which is discontinuous wherever a gain change has occurred in the coding of the seismic traces. At these points, the display does not visually appear as a smooth function of time thus making interpretation by a geophysicist somewhat difficult. In processing seismic data, one objective is to recover accurately the output of each seismometer for display purposes. To accomplish this, a division by a fixed factor is performed and when the seismometer output is small the dynamic range will be lost. Therefore, it is desirable to multiply each coded trace representing a seismometer output by a known smoothly varying function which gives a reasonable modulation level to prevent loss of dynamic range. A feature of this invention is the recovery of binary gain without loss of dynamic range.

Another feature of the present invention is to provide a playback tape for display purposes which contains continuous evenly modulated signals for each trace transferred from a BGC record.

In accordance with the present invention, there is provided a method of generating a visual display from a BGC record by producing a first signal which is the combination of an individual BGC trace with the reciprocal of its gain factor. A second signal is produced which is suitable for playback (visual presentation) by combining the first signal with a smoothly varying gain function thereby producing a continuous evenly modulated signal.

More complete understanding of the invention and its advantages will be apparent from the specification and claims and from the accompanying drawings illustrative of the invention.

Referring to the drawings.

Although a binary gain control recording for seismic exploration will be described, this invention is also applicable to any data recorded with BGC. Also, it is not intended to imply that the invention is restricted to gain changes of a factor or two. A practical system might allow changes by a factor of eight or sixteen. Further, no restriction is intended to a twenty-four trace system. Finally, it is not intended that the invention be restricted to a particular type of BGC amplifier system nor by a particular tape format.

Figure 1:
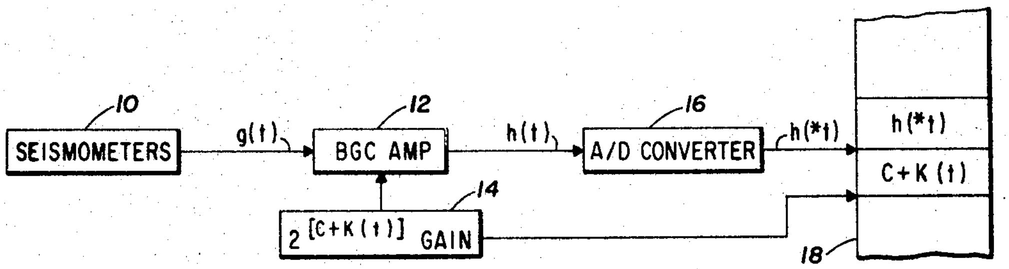
FIGURE 1 is a block diagram of a binary gain control digital recording system.

To produce a BGC recording, a system of the type shown in FIGURE 1 is provided which includes seismometers 10 coupled to a BGC amplifier 12. The seismometers 10 respond to traveling waves reflected from and traveling through the substrate layers of the earth's crust. These waves can be generated by means of an energy source, such as an explosion at or near the earth's surface some distance from the seismometers. In a typical seismic exploration, many individual seismometers are positioned about the center point of the energy source and produce an analog voltage proportional to the traveling wave incident thereon. In FIGURE 1, the block 10 is intended to represent a number of seismometers (for example twenty-four) in a particular array coupled to a BGC amplifier 12. The BGC amplifier 12 connects to a gain control network 14 and generates an output signal to an analog-to-digital converter 16. A signal from the *A/D* converter 16 at some instant of time is a digital representation of a seismic wave detected by one of the seismometers 10. This signal is recorded on a tape 18 along with the gain factor exponent established by the network 14 for that particular signal at a given sample time. Typically, the tape 18 is a one-half inch tape having nine recording tracks. Preferably, the tape 18 is of the magnetic type although other tapes may be used.

As stated previously, in a binary gain control recording, the gain is restricted to change up or down by a given factor. If it is assumed this gain factor is two, then at any sample time the gain factor can be expressed in the following form:

$$G=2^{[C+K(t)]} \quad (1)$$

where C is an integer exponent corresponding to an initial gain setting and is a constant for a given recording, and K($t$) is a exponent variable with time and is equal to the algebraic sum of the positive and negative gain changes occurring from time zero (time break) to time $t$.

For each trace on the tape 18 the output of the amplifier 12 can be represented by:

$$h(t)=g(t)\times 2^{[C+K(t)]} \quad (2)$$

where $h(t)$ is the output of the amplifier 12, $g(t)$ is the output voltage of a seismometer 10, and $C+K(t)$ is the power of the gain factor two applied to the amplifier 12 from the network 14. The power of the gain factor changes for each trace at each sample time to keep the digital code recorded on the tape 18 near full modulation. The actual number $h^*(t)$ encoded on the tape 18 is the digitized value of the value $h(t)$ at signal time t. A direct playback of the information encoded on the tape 18 would display discontinuities on the seismic traces at the time where a change in gain factor occurred. Thus, at these points, the record would not visually appear as a smooth function of time.

Figure 2:
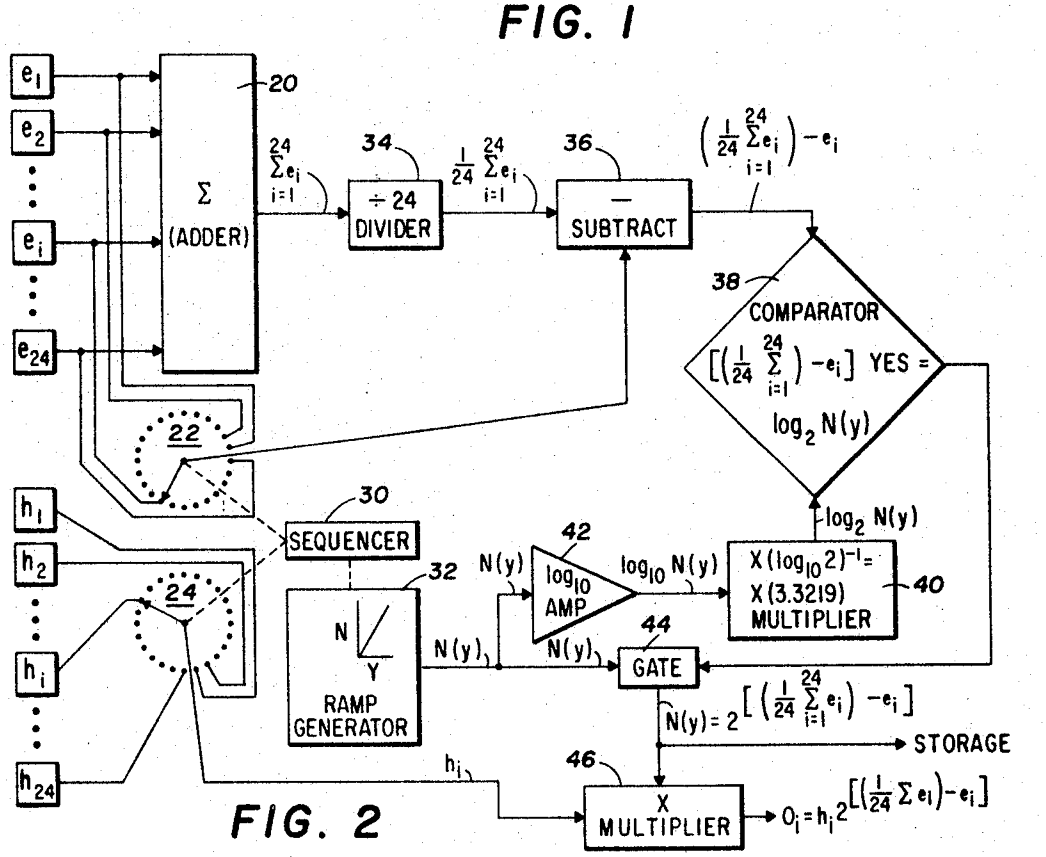
FIGURE 2 is a schematic of a system for binary gain recovery using the recording tape of FIGURE 1.

In accordance with the present invention, there is shown in FIGURE 2 a representative system for producing a smoothly varying function for each trace recorded on the tape 18. In general, the tape 18 may include 100 records with twenty-four seismic traces on each record. For each sample time, for each trace, the tape 18 includes a coded signal and an associated gain factor exponent. The gain factor exponents for each sample time for each of the twenty-four traces on one record are simultaneously transferred to a summing network 20 and to the point contacts of a switch 22. Synchronized with the transfer of the gain factor exponents by means of a sequencer 30, twenty-four coded traces associated with the transferred gain factor exponents are transferred from the recording tape 18 to the point contacts of a switch 24. Switches 22 and 24 are sequentially operated by means of mechanical connections 26 and 28 to the sequencer 30 which is also coupled to a ramp generator 32.

The twenty-four gain factor exponents and coded traces for one sample time are processed through the system of FIGURE 2 independently of all other sample times. After the sequencer 30 has advanced through all twenty-four positions, the next sample time is coupled to the switches 22 and 24. This sequential operation continues for all sample times recorded on the tape 18. The result is a composite of all the recorded sample times to produce a smoothly varying function for each seismic trace.

A divider network 34 is coupled to the output of the summing network 20 and to the input of a subtraction network 36 which also receives a signal through the wiper arm of the switch 22. The output of the subtraction network 36 connects to a comparator 38 for comparison with a signal from a mutliplier 40. Multiplier 40 receives an input signal from a $\log_{10}$ amplifier 42 which in turn is connected to the ramp generator 32. Also tied to the ramp generator 32 and the comparator 38 is a gate 44 for transferring the output of the ramp generator to a multipler 46. In addition to the gate 44, the multiplier 46 also connects to the wiper arm of the switch 24.

The twenty-four gain factor exponents are added in the summation network 20 and a sum total signal is transmitted to the divider 34. The output of the summation network 20 is represented by the expression:

$$\sum_{i=1}^{24} e_i \quad (3)$$

where $e_i$ is the exponent of 2 as given in Equation 1 for trace $i$ at time $t$. An average of the sum total is taken in the divider 34 and transmitted to the subtraction network 36. Depending on the sequencer 30, one of the gain factor exponnents (exponent of two) is transmitted through the switch 22 and subtracted from the average in the subtraction network 36. The output of the subtraction network 36 may be represented by:

$$\frac{1}{24}\left(\sum_{i=1}^{24} e_i - e_i\right) \quad (4)$$

where is the average of the gain factor exponents less the gain factor exponent for the trace being conditioned for playback.

Simultaneously with the stepping of the switches 22 and 24, the sequencer 30 causes the ramp generator 32 to begin generating a ramp voltage coupled to the $\log_{10}$ amplifier 42. The output of the amplifier 42 equals the $\text{logarithm}_{10}$ of the function generated by the ramp generator 32. This signal is transmitted to the multiplier 40 and a signal is generated which is the $\log_2$ of the function generated by the ramp generator 32. The comparator 38 generates a logic gate signal to the gate 44 when the output of the multiplier 40 approximately equals the output of the subtraction network 36. This logic signal opens the gate 44 to transmit the output of the ramp generator 32 to the multiplier 46 and to a storage unit (not shown) for subsequent processing of the seismic traces. At this time, the output of the ramp generator 32 is given by the expression:

$$N(y)=2\left[\left(\frac{1}{24}\sum_{i=1}^{24} e_i\right)-e_i\right] \quad (5)$$

where N($y$) is the function generated by the ramp generator.

The sequencer 30 has positioned the switch 24 such that the coded trace for the gain factor exponent switched to the subtraction network 36 is transmitted to the multiplier 46. A muliplication is performed on the coded trace by the ramp generator output to produce a smoothly varying playback signal. For any instant of time, the output of the multiplier is given by the equation:

$$O_i=h_i 2\left[\left(\frac{1}{24}\sum_{i=1}^{24} e_i\right)-e_i\right] \quad (6)$$

where $h_i$ is the coded value of trace $i$ at time $t$ transmitted through the switch 24 from the tape 18.

Figure 3:
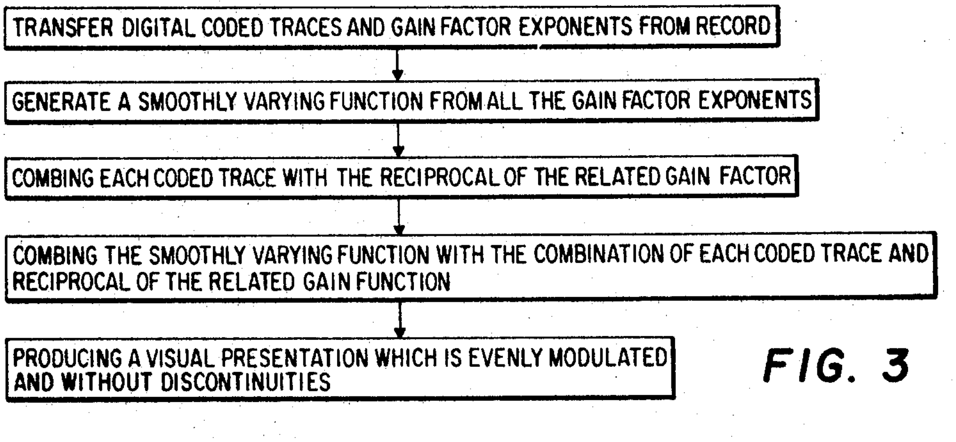
FIGURE 3 is a flow diagram showing the steps of a method for binary gain recovery in accordance with the present invention.

Referring to FIGURE 3, there is shown a flow diagram of the steps of a method for producing a continuous display from the digital information recorded on the tape 18 of FIGURE 1. Initially the digital coded traces and their respective gain factor exponents for one sample time are transferred from a record. Subsequently the same transfer operation takes place for all sample times from $t=0$ to $T_{max}$. For purposes of this description, let $h_i(t)$ represent the coded trace written on the tape 18 for the time instant $t$ for trace $i$, where $i=1, 2, \ldots 24$. Each gain factor exponent will be represented by the term $[C_i+K_i(t)]$ where $C_i$ is the initial power to which a fixed gain factor is raised for the trace $i$ at time zero, and $K_i(t)$ is the variable power to which a fixed gain is raised for trace $i$ at time $t$.

After the twenty-four coded traces and their respective gain factor exponents have been transferred from the tape 18, a smoothly varying gain function is generated by averaging all the transferred gain factor exponents. For the system represented in FIGURE 2, this step is completed by the summation network 20 in conjunction with the divider circuit 34 and the ramp generator 32. This smoothly varying function is the average exponent, $\alpha(t)$, of the gain factor as established by the network 14 for all twenty-four traces at time $t$ and is represented by the expression:

$$\bar{\alpha}(t)=1/24\Sigma[C_i+K_i(t)] \quad (7)$$

Since the average exponent is not necessarily an integer, it must be carried out to several decimal places for the function to be smoothly varying.

Next, each coded trace is combined with the reciprocal of its related gain factor for removal of the binary gain. Rewriting Equation 2 for the general case, then:

$$h_i(t)=g_i(t)\times 2^{[C_i+K_i(t)]} \quad (8)$$

where $g_i(t)$ equals the input signal for trace $i$ at time $t$ from one of the seismometers 10. It is assumed that this term excludes filter response of the amplifier 12. Transposing the gain factor and its exponent, the above equation can be rewritten as:

$$g_i(t)=h_i(t)\times 2^{-[C_i+K_i(t)]} \quad (9)$$

This equation represents the original seismic data connected to the amplifier 12 for the trace $i$ from time $t=0$ to $t=T_{max}$.

The fourth step is the application of the smoothly varying gain function $\alpha(t)$ to the original seismic data term $g_i(t)$. Combining the smoothly varying gain function with the seismic data results in the expression:

$$O_i=g_i(t)\times 2^{\bar{\alpha}(t)}$$

$$O_i=h_i(t)\times 2^{-[C_i+K_i(t)]+\bar{\alpha}(t)}$$

$$O_i=h_i(t)\times 2^{1/24\Sigma\{C_i+K_i(t)\}-C_i-K_i(t)} \quad (10)$$

where $O_i$ is a playback signal of trace $i$ at time $t$. Note, that steps three and four can be combined as shown by the system of FIGURE 2. Instead of removing the binary gain from the transferred coded trace, the gain factor exponent is subtracted from the average of all gain factor exponents. In FIGURE 2 this is accomplished by the subtraction network 36. The end result is the same as is apparent by a comparison of the output of the multiplier 46 with Equation 10 above.

The final step is the production of a visual presentation which is evenly modulated and without discontinuities. This can be performed directly following step four or indirectly from an intermediate recording. Where an intermediate recording is made, the result of step four and the smoothly varying gain function are placed on an output record for time $t=0$ to $t=t_{max}$ and $i=1$ to 24. Prior to placing the smoothly varying gain function on the output record, it must be encoded in a form required by the specific hardware of the system. Where the above steps are performed on analog signals, the result of step four is in a form ready for display presentation. However, where a digital system is employed to complete the above steps, a digital-to-analog conversion operation is required as a prerequisite to producing a visual display.

While several embodiments of the invention, together with modifications thereof, have been described in detail herein and shown in the accompanying drawings, it will be evident that various further modifications are possible without departing from the scope of the invention.

What is claimed is:

1. A method of recovering binary gain from a record including a plurality of digitally coded traces and a gain factor exponent for each trace comprising:

transferring the coded traces from said record to a trace processing network and the individual gain factor exponents from said record to an averaging network, generating a smoothly varying function from the average of all the recorded gain factor exponents transferred to the averaging network for a particular sample time represented on said record, removing the binary gain from each individually coded trace transferred to the trace processing network by combining each individual trace with the reciprocal of the related gain factor exponent, and combining in the trace processing network the smoothly varying function with the binary trace signal independent of gain factor to generate a smoothly varying biased original trace signal.

2. A method of recovering binary gain as set forth in claim 1 including the step of producing a visual presentation which is continuous and evenly modulated and from said smoothly varying biased original trace signal.

3. A method for recovering binary gain as set forth in claim 1 including the step of recording the smoothly varying biased original trace signal and the smoothly varying function.

4. A method for recovering binary gain as set forth in claim 3 including the step of converting the recorded smoothly varying biased original trace signal from digital to analog form for presentation as a continuous evenly modulated display.

5. A method for recovering binary gain from a record having a plurality of digitally coded traces and a gain factor exponent for each trace comprising:

transferring the plurality of coded traces to a trace processing network and associated gain factor exponents to an energizing network from said coded record, combining all of said gain factor exponents transferred to the energizing network from said record to generate a smoothly varying signal representative of the average of all of said gain factors, sequentially combining each of said gain factor exponents with said gain factor average to produce an individual trace gain recovery signal, generating a gain factor in accordance with said gain recovery signal to produce a smoothly varying biasing function, and sequentially coupling a coded trace with said smoothly varying biasing function in the trace processing network to generate a continuous evenly modulated signal.

6. A method for recovering binary gain as set forth in claim 5 wherein the generation of said gain factor is sequenced with the sequential coupling of said gain factor exponents and coded traces.

7. A method for recovering binary gain as set forth in claim 6 including means for recording said continuous evenly modulated signal and said smoothly varying biasing function.

8. A method for recovering binary gain as set forth in claim 7 including producing a visual presentation from the continuous evenly modulated signal from said recording.

9. A method for recovering binary gain from a seismic record including a plurality of binary gain coded traces and a gain factor exponent for each trace comprising:

transferring the coded traces and their individual gain factor exponents from said seismic record, generating a first electrical signal representative of the original binary trace signal without binary gain by combining a transferred coded trace with the reciprocal of the related gain factor, and generating a second electrical signal which is a smoothly varying gain function and combining it with said first electrical signal to produce a continous evenly modulated signal for display presentation.

10. A method of recovering binary gain from a seismic record as set forth in claim 9 including the step of converting said second electrical signal from a digital to an analog presentation.

11. A method for recovering binary gain from a seismic record as set forth in claim 10 including the step of producing a visual presentation of said continuous evenly modulated second electrical signal.

12. A method for recovering binary gain from a seismic record including a plurality of binary gain coded traces and a gain factor exponent for each trace comprising:

reading a binary gain coded seismic record to transfer the individual traces and the respective gain factor exponents therefrom, constructing a smooth gain function by averaging the exponents of a fixed gain factor for all of said traces for each time sample and raising the fixed gain factor by the average exponent, removing the binary gain from each trace and replacing it with the smooth gain function, coding said smooth gain function, recording the process traces and the coded smooth gain function on an output record, and producing a visual presentation which is continuous and evenly modulated from said recording.

13. A system for recovering binary gain from a record including a plurality of digitally coded traces and a gain factor exponent for each trace comprising:

means for transferring the coded traces and the individual gain factor exponents from said record, means for generating a smoothly varying function from the average of all the recorded gain factor exponents transferred from said record for a particular sample time represented on said record, means for combining each individually coded trace with the reciprocal of the related gain factor to generate a binary trace signal independent of a gain factor, and means for combining the smoothly varying function with the binary trace signal independent of a gain factor to generate a smoothly varying biased original trace signal.

14. A system for recovering binary gain as set forth in claim 13, including means for producing a visual presentation which is continuous and evenly modulated from said smoothly varying biased original trace signal.

15. A system for recovering binary gain as set forth in claim 13, including means for recording the smoothly varying biased original trace signal and the smoothly varying function.

16. A system for recovering binary gain as set forth in claim 15, including means for converting the recorded smoothly varying biased original trace signal from digital to analog form for presentation as a continuous evenly modulated display.

17. A system for recovering binary gain from a record having a plurality of digitally coded traces and a gain factor exponent for each trace comprising:

means for transferring the plurality of coded traces and associated gain factor exponents from said coded record, means for combining all of said gain factor exponents transferred from said record to generate a smoothly varying signal representative of the average of all of said gain factors, means for sequentially combining each of said gain factor exponents with said gain factor average to produce an individual trace gain recovery signal, means for generating a gain factor in accordance with said gain recovery signal to produce a smoothly varying biasing function for each trace, and means for sequentially coupling the coded traces to the related smoothly varying biasing function to generate a continuous evenly modulated signal.

18. A system for recovering binary gain as set forth in claim 17, including means for recording said continuous evenly modulated signal and said smoothly varying biasing function.

References Cited

UNITED STATES PATENTS 3,315,223 4/1967 Hibbard et al.

RODNEY D. BENNETT, Jr., Primary Examiner

DANIEL C. KAUFMAN, Assistant Examiner